Feb. 13, 1951  F. R. QUINN  2,541,832
ELECTRIC CURRENT RECTIFIER
Filed July 22, 1949
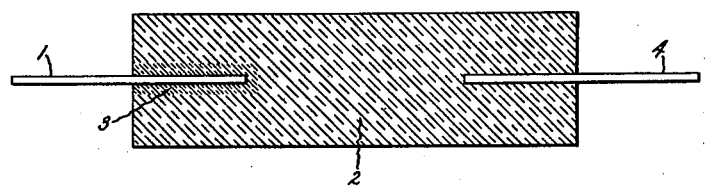
Inventor:
Frederic R. Quinn,
by
His Attorney.

Patented Feb. 13, 1951

2,541,832

UNITED STATES PATENT OFFICE 2,541,832

ELECTRIC CURRENT RECTIFIER

Frederic R. Quinn, Schenectady, N. Y., assignor to General Electric Company, a corporation of New York Application July 22, 1949, Serial No. 106,294

20 Claims. (Cl. 175—366)

The present invention relates to en electric current rectifier of the dry or contact type. More particularly, it relates to a dry type rectifier comprising a metal sulfide element.

While sulfide type rectifiers have long been known, most of the dry type rectifiers now on the market are of the selenium or oxide type. Some of the reasons for the lack of commercial success of the sulfide rectifiers are their relative instability, low current-carrying capacity, and an inability to withstand high inverse voltages.

An object of the invention is to provide a new and improved sulfide type dry rectifier having improved temperature characteristics.

Another object of the invention is to provide a stable sulfide type rectifier capable of operating at temperatures up to 350° C. and of withstanding comparatively high inverse voltages.

Additional objects of the invention will become apparent from the following description thereof when considered in connection with the accompanying drawing in which the single figure is a sectional view of a simple rectifying element embodying the invention.

Briefly described, the rectifier of the present invention is essentially characterized by a stable sulfide element or electrode which is a sintered pressed mixture of at least two metal sulfides, at least one of which is a sulfide of a metal of group II of the periodic table. Employing a cooperating metal electrode of molybdenum, there is formed on the metallic electrode a current-blocking layer of molybdenum sulfide.

One modification of the invention is shown in the drawing in which numeral 1 indicates a molybdenum or molybdenum coated electrode element in the form of a wire embedded in one end of a cooperating element 2 composed of a sintered pressed mixture of metal sulfides. A current blocking layer 3 of molybdenum sulfide formed in a manner to be described more fully hereinafter surrounds the embedded portion of the wire 1 and with the wire forms an asymmetric couple. Wire 1 forms one electrode or terminal for the alternating current input while a wire 4 embedded in the opposite end of electrode element 2 comprises the second terminal for making electrical contact with element 2. This terminal 4 or at least the surface portion thereof in contact with the sulfide body 2 is preferably of a metal or alloy which possesses the property of reacting only to a limited extent with sulfur to form on the surface thereof a thin, stable film of metal sulfide which, under service conditions, will prevent further reaction between the lead or terminal 4 and any free sulfur present in body 2. Examples of metals suitable for this purpose are platinum, chromium, nickel, nickel alloys, e. g., Nichrome or Chromaloy, aluminum, tungsten and thorium coated tungsten.

In order to obtain a stable unit capable particularly of withstanding elevated temperatures, it is essential that the mixture of sulfides comprising element 2 include a sulfide of a metal of group II of the periodic table. It has been found that mixtures of one or more such sulfides and molybdenum sulfide possess exceptionally good time and temperature stability and rectifier units comprising such mixtures can be operated for long periods of time at room or elevated temperatures without deterioration as by the release or liberation of sulfur. In general, the less expensive calcium or cadmium sulfides are preferred.

Of the various group II metal sulfides, calcium sulfide appears to be the best binder with cadmium ranking the next to calcium in this respect. Calcium sulfide also has the advantage of exhibiting a relatively constant resistance temperature coefficient within the range of temperatures in which the present rectifiers are adapted to operate. Cadmium sulfide also has a reasonably constant resistance temperature coefficient over this range of temperatures. Of the remaining sulfides, magnesium sulfide appears to have a better binding effect than those of barium or zinc. The mixed sulfides may also contain two or more group II metal sulfides as, for example, a mixture of calcium and mercury sulfides.

In the preparation of the rectifier units, the finely divided molybdenum disulfide and group II metal sulfide or sulfides are mixed in the desired proportions and the mixtures pressed to the required form or shape. The molybdenum element and the terminal 4, for example, in the form of a nickel wire, are pressed into or into contact with the ends of the sulfide body during the pressing operation.

The mixtures of sulfides employed in the practice of the present invention should comprise from 5 to 50% of molybdenum disulfide, from 2 to 10% free sulfur, with the balance being made up of one or more of the sulfides of the group II metals. Preferably, the molybdenum disulfide should be present in amounts ranging from about 25 to 50% as it has been found that with such mixtures rectifiers having the minimum forward resistance are obtained. For example, an element formed from a mixture of 30% molybdenum disulfide, 10% sulfur, and 60% calcium sulfide has been found to have a forward resistance of about 2 ohms, whereas an element prepared from a sintered mixture of only 5% molybdenum disulfide, 10% sulfur, and the balance calcium sulfide may have a forward resistance as high as 500 ohms. When the mixtures contain more than 50% molybdenum sulfide, some flaking or laminating of the pressed mixtures may be noted.

After pressing, the elements are sintered at an elevated temperature of from about 500 to 800° C. In addition to providing a stronger element, the sintering step has the added object of providing an element in which the resistance in one direction is low as compared with that of the opposite direction. For example, in the expressed condition, and at low temperatures, e. g., room temperature, the resistance of an element ⅛ inch in diameter with a distance between the embedded ends of the molybdenum and nickel terminals of about ¼ inch will be high and of the order of 20 to 30,000 ohms in both directions. The same resistance characteristics are noted in elements sintered at less than 500° C. However, when the same element is sintered at a temperature above 500° C. and preferably at least 600° C., for from 1 to 2 hours, it will be found that the resistance in the Mo-Ni direction is low and of the order of about 2 ohms at room temperature, while the resistance in the opposite direction is even higher than prior to the sintering operation. Thus, the major advantage of the sintering operation is to provide an element which has a definite rectifying action and which will require the minimum forming treatment. As these resistance characteristics of the sintered product are permanent in the final product, there is thus obtained an improved voltage regulation and a loading resistor is not required.

The forming step of the present invention preferably comprises a polarization treatment which includes passing a direct current through the element with the molybdenum lead as the cathode. Preferably, the element is kept at an elevated temperature during the polarization process, i. e., at such an elevated temperature that the resistance of the element in this direction will be low and of the order of a few ohms. The minimum temperature will vary from about 250° C. for the units in which the sulfide body contains about 5% molybdenum sulfide to at least 350° C. when the molybdenum sulfide content of the sulfide mixture is 50%.

In the polarization treatment, a D.-C. current of a reasonably high density, e. g., 5 to 200 amperes per square inch, is passed through the element at the elevated temperature, whereby the free sulfur in the pressed and sintered body 2 is deposited on the embedded portion of the molybdenum electrode 1 to build up the barrier of the molybdenum sulfide 3. By thus using up all of the free sulfur ions, there is obtained a stable element whose conductivity is only or mainly electronic rather than both ionic and electronic. The molybdenum sulfide formed around the molybdenum lead 1 in addition to forming a current blocking barrier at temperatures below 285° to 350° C. depending upon the molybdenum sulfide content of the body 2 also forms a good electrical and mechanical bond between the electrode 1 and the body 2. To obtain a similar bond between the lead or terminal 4 and body 2, it has also been found desirable at some point during the polarization process to reverse the current for a short period of time to build up on the lead 4 a thin layer of metal sulfide as, for example, nickel sulfide in the case of a nickel lead.

The resultant rectifier unit comprises a molybdenum element 1, the mixed sulfide element 2, and the intervening barrier of molybdenum sulfide 3. This molybdenum sulfide built up on the surface of the molybdenum element will allow the current to flow in the direction from molybdenum to molybdenum sulfide but presents a barrier of high resistance to the flow of electrons when the current is reversed. The resultant rectifiers can be operated satisfactorily at temperatures up to 250° C. for those in which the molybdenum sulfide content of the body 2 is low and up to 350° C. when the body 2 is made from mixtures rich in molybdenum sulfide. They are capable of withstanding high voltages in the neighborhood of 80 to 90 volts and current densities as high as 50 amperes per square inch.

It will be noted that the rectifiers of the present invention differ also from the previously known sulfide type rectifiers in that the direction of current flow is from molybdenum to molybdenum sulfide, whereas with the usual sulfide rectifiers, the direction of current flow is from metal sulfide to metal.

While the invention is particularly described with reference to a rectifier in which the metal element has been formed of a molybdenum wire, it is to be understood that the units of the present invention may take any of a number of forms or shapes. For example, the molybdenum element may be in the form of a plate or a cup pressed into contact with the sulfide element in accordance with the usual practices of the dry rectifier art.

What I claim as new and desire to secure by Letters Patent of the United States is:

1. A rectifier element comprising a molybdenum electrode and a second electrode comprising a mixture of molybdenum sulfide and a sulfide of a group II metal and means for making electrical contact with the second electrode.

2. An element of claim 1 in which the group II metal is calcium.

3. An element of claim 1 in which the group II metal is cadmium.

4. An element of claim 1 in which the group II metal is zinc.

5. A rectifier unit including a molybdenum electrode, a second electrode of a sintered mixture of metal sulfide including molybdenum sulfide and a sulfide of a group II metal, a layer of molybdenum sulfide between said electrodes and a contact electrode electrically connected to said second electrode.

6. A rectifier including a sintered pressed mixture of sulfides including a sulfide of a group II metal and from 5 to 50% by weight of molybdenum sulfide surrounding the embedded portion of in the sintered mixture with a layer of molybdenum sulfide surrounding the embedded portion of said electrode, a contact electrode embedded in the sintered mixture and bonded thereto by a layer of sulfide.

7. A rectifier of claim 6 in which the group II metal is calcium.

8. A rectifier of claim 6 in which the group II metal is cadmium.

9. A rectifier of claim 6 in which the group II metal is zinc.

10. A rectifier unit including a molybdenum electrode, a second electrode comprising a sintered mixture of molybdenum sulfide and a group II metal sulfide, a layer of molybdenum sulfide between said electrodes and a metal terminal in contact with the second electrode and bonded thereto by a layer of sulfide of the terminal metal.

11. A unit of claim 10 in which the terminal is composed of nickel.

12. The method of making a dry rectifier which comprises pressing a mixture of metal sulfides including a group II metal sulfide and a small amount of sulfur into contact with a molybdenum electrode, and sintering the sulfide mixture at a temperature of at least 500° C.

13. The method of making a dry rectifier which comprises pressing a mixture of metal sulfides including a group II metal sulfide and a small amount of sulfur into contact with a molybdenum electrode, and sintering the sulfide mixture at a temperature of at least 500° C. and passing a direct current through the sintered product to form a layer of molybdenum sulfide on the molybdenum electrode.

14. The method of making a dry rectifier which comprises forming a mixture of sulfides including 5 to 50% molybdenum sulfide, 2 to 10% sulfur and a sulfide of a group II metal, pressing the mixture into contact with a molybdenum electrode, sintering the mixture at a temperature of from 500 to 800° C. and passing a current through the sintered mixture and molybdenum electrode to form a layer of molybdenum sulfide on the molybdenum electrode.

15. The method of making a dry rectifier which comprises forming a mixture of sulfides including 5 to 50% molybdenum sulfide, 2 to 10% sulfur and a sulfide of a group II metal, pressing the mixture into contact with a molybdenum electrode, sintering the mixture at a temperature of from 500 to 800° C. and passing a current through the sintered mixture and molybdenum plus electrode to deposit on the molybdenum electrode the free sulfur remaining in the sintered product in the form of a layer of molybdenum sulfide.

16. The method of making a dry rectifier which comprises forming a mixture of sulfides including from 30 to 50% by weight of molybdenum disulfide, 2 to 10% sulfur, balance at least one sulfide of a group II metal, pressing said mixture into contact with a molybdenum terminal and a second metallic terminal which will react with sulfur to form a stable sulfide film thereon, a portion of each of said terminals being embedded in the pressed mixture, sintering the pressed mixture at a temperature of at least 500° C. and thereafter passing a current through the product at an elevated temperature at which its electrical resistance is low to form a barrier layer of molybdenum sulfide on the molybdenum terminal and a bonding layer of metal sulfide on the second terminal.

17. The method of claim 16 wherein the second terminal is composed of nickel.

18. The method of claim 16 wherein the second terminal is a nickel base alloy.

19. The method of claim 16 wherein the second terminal is a nickel chromium alloy.

20. A rectifier unit comprising adjacently disposed elements, one of said elements being composed of molybdenum and the other of said elements comprising a mixture of sulfides including molybdenum sulfide and at least one sulfide of a metal of the group consisting of calcium, magnesium, cadmium, barium, zinc and mercury and means for making electrical contact with said other element.

FREDERIC R. QUINN.

REFERENCES CITED

The following references are of record in the file of this patent:

UNITED STATES PATENTS

| Number | Name | Date |
|---|---|---|
| 1,751,361 | Ruben | Mar. 18, 1930 |

Certificate of Correction

Patent No. 2,541,832 February 13, 1951

FREDERIC R. QUINN

It is hereby certified that error appears in the printed specification of the above numbered patent requiring correction as follows:

Column 4, line 61, for "sulfide surrounding the embedded portion of" read *disulfide, a molybdenum electrode embedded*;

and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*